Jan. 14, 1964  C. N. EVERETT  3,117,511
HOT DOG DISPENSING MACHINE
Filed Aug. 24, 1960  2 Sheets-Sheet 1

INVENTOR.
CARL N. EVERETT
BY
ATTORNEYS

Jan. 14, 1964  C. N. EVERETT  3,117,511
HOT DOG DISPENSING MACHINE
Filed Aug. 24, 1960  2 Sheets-Sheet 2

INVENTOR.
CARL N. EVERETT

ATTORNEYS

United States Patent Office 3,117,511
Patented Jan. 14, 1964

3,117,511
HOT DOG DISPENSING MACHINE
Carl N. Everett, New York, N.Y., assignor, by direct and mesne assignments, to Carbob Corporation, a corporation of New York
Filed Aug. 24, 1960, Ser. No. 51,679
2 Claims. (Cl. 99—357)

This invention relates to a coin-operated hot dog dispensing machine and more particularly to a hot dog dispensing machine which will thoroughly cook a hot dog while at the same time heat a bun into which the hot dog is to be placed.

Coin-operated hot dog dispensing machines which are currently used for the most part require complicated expensive packages in order that a hot dog which is packaged therein may be thoroughly cooked. Some of these packages require special metal pins which extend through the package ends and pierce the ends of the hot dog and which are packaged with the hot dog. These pins serve as electrodes by which an electrical current may be transmitted to the hot dog in order to cook it. Even when such packages are used, there is still no means provided for heating the bun so that when the customer receives the cooked hot dog and bun from the machine, the bun itself is cold. This is more so where the packaged hot dog and bun are stored in refrigerated cabinets contained in the dispensing machine.

Broadly, I intend to overcome the aforementioned difficulties of expensive packaging and difficulty of heating a bun dispensed with the cooked hot dog by providing for a hot dog dispensing unit which has therein a dispensing unit which may hold a plurality of novel package units, each containing a hot dog and bun. The machine, in addition, contains a cooking station which has therein two reciprocally movable electrical heating pins which are solenoid operated so that when a package is transferred into the cooking station from a storage unit, the pins will move so that they pierce the ends of the package and the skin at the ends of the hot dog in order to become imbedded into the hot dog a substantial distance.

In addition, I provide for at least one electrical heating element to be affixed to at least one of the pins and disposed beneath the pin in order to engage the interior of a bun. A timing means is provided which controls passage of an electric current through the pins in order to cook the hot dog while at the same time to heat the heating element and thus warm the bun.

The package unit itself contains a hot dog and bun so disposed relative to one another to allow the bun to be warmed at the same time the hot dog is cooked. The bun is V-shaped and placed in the package so that its open end is up. Separator strips are placed over the bun on which the hot dog rests. A portion of the package containing the hot dog and bun may be made of a transparent material so that the customer may view the cooking through a window contained on the dispensing machine. After the hot dog has been cooked, the bun, heated, and the package delivered to the customer, the customer may remove the strips allowing the hot dog to fall into the bun.

Referring to the drawings in which a preferred embodiment of my invention is illustrated, FIG. 1 is a perspective view of a complete hot dog dispensing unit constructed according to my invention;

Figure 1:
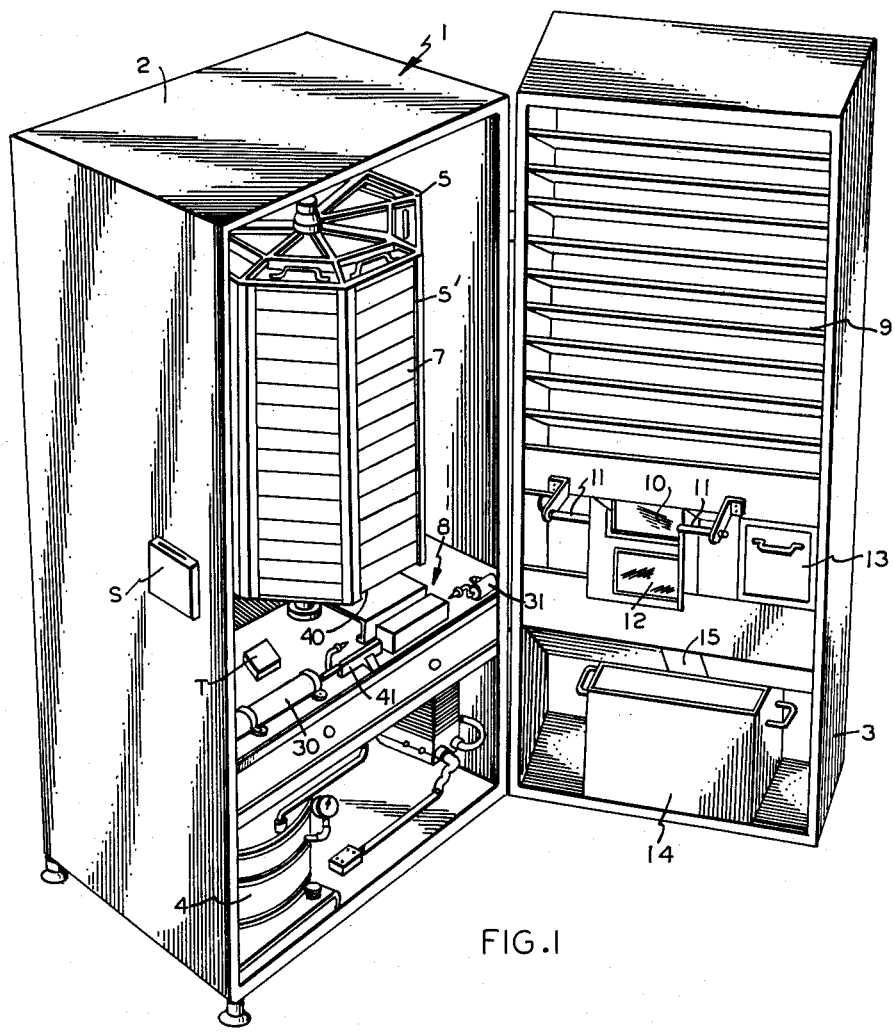

Referring to the drawings in greater detail and in particular to FIG. 1, 1 denotes generally a hot dog dispensing unit having a cabinet 2 on which there is a door 3. The cabinet 2 is refrigerated by means of refrigerator unit 4 in order that the contents of the cabinet will not become spoiled. A rotatable storage unit 5 which is rotatable about shaft 6 contains therein a plurality of tracks 5' which in turn carry a plurality of package units 7, each containing a hot dog and bun. A cooking station denoted generally by 8 is placed in the middle at the front of the cabinet so that it is immediately below a stack of packages 7 contained in the unit 5.

The door 3 has on its inner side a series of shelves 9 wherein extra packages may be stored before they are stacked in the unit 5. The door 3 also has therein a view window 10 through which a customer may view a hot dog while cooking. Lights 11 illuminate the cooking area in order that the customer may see the hot dog while in the cooking station. Swinging door 12 is contained in the door 3 so that the customer may pick up the package containing the hot dog and bun after it has been cooked.

In addition, the door contains a mustard compartment which has a swinging door (not shown) on the opposite side of door 3 wherein the customer may procure mustard to spread on his hot dog and bun. Disposal unit 14 is mounted on the bottom of the door in order that the customer may dispose of his package through the swinging door 15 after he has finished eating his hot dog and bun.

Figure 2:
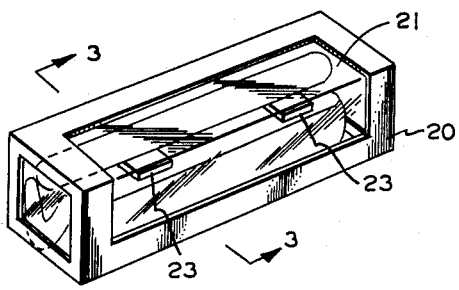
FIG. 2 is a perspective view of a package unit used in the machine as illustrated in FIG. 1.

Referring to FIG. 2, 20 illustrates a cardboard package having a transparent portion 21. The package 20 contains therein a bun 22 which is V-shaped in the cross-sectional view. The bun 22 has lying on its open end thereof strips 23 which also may be made of a cardboard material on which a hot dog 24 rests, the purpose of which is more fully explained hereafter. The package 20, bun 22, strips 23 and hot dog 24, all together form a package unit 7.

Figure 4:
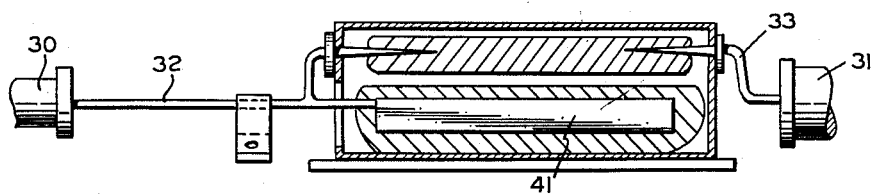
FIG. 4 is an enlarged view of the cooking station illustrating the hot dog in cooking position and the bun in heating position.

Referring to FIG. 4 which illustrates a package unit in the cooking station, 30 and 31 are solenoids having connected thereto plungers 32 and 33 which serve as electrodes or heating pins. The heating pins 32 and 33 are pointed at their ends so that they may easily pierce the package 20 and the ends of the hot dog 24 when moved towards the package by the solenoids.

Figure 3:
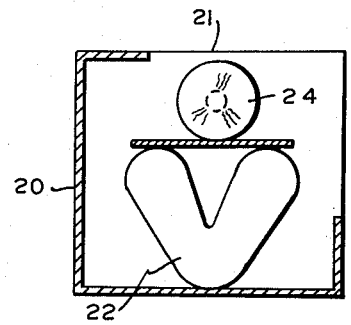
FIG. 3 is a cross-sectional view of FIG. 2 taken along lines 3—3.

A heating element 41 is affixed to one of the heating pins so that it extends parallel to the pin and below it. As seen in FIG. 4, the heating element will extend into the bun in the open V-space to engage one of the inside straight sides of the bun to heat the same. The end of the heating element is sharpened in order that it may easily pierce the ends of the package 20. By holding the hot dog above the bun, as shown in FIG. 3, the heating element will have room to extend into the bun. If the hot dog were in the bun at the time the heating element pierced the box, there would be a possibility of the element cutting the hot dog.

Storage unit rotation means (not shown) are provided so that the unit 5 may be automatically rotated when a track 5' is emptied of packages. In addition, a dispensing unit 40 is provided at the bottom of each track so that when the track is immediately above the cooking station, it will be actuated by dropping a coin in the slot S to allow a package unit to fall into the cooking station.

The dropping of the coin in the slot S will also actuate a timer T which in turn will cause the solenoids 30 and 31 to move the heating pins and heating element so that they pierce the ends of the package and so that the pins are firmly embedded in the ends of the hot dog. Current is then passed through the heating pins and to the heating element. After a period of time, which is controlled by the timer, the current will be turned off from the heating pins and heating element and the solenoids will be caused to move so as to return the heating element and pins to a position whereby they will be ready to receive another package unit from the storage unit. The customer, when he sees the solenoids return, will know that his hot dog is cooked and he may reach through the door 12 to grasp the package unit.

The various electric circuits, timer unit, etc. are conventional so that it is not necessary to illustrate their electric circuits. While I have shown a preferred embodiment of my invention, it is obvious that structural changes such as including heating elements on both heating pins could be made and still come within the scope of my invention which is to be limited only by the appended claims.

I claim:
1. A coin-operated hot dog vending machine having a refrigerated storage unit, a plurality of package units carried by said storage unit, each said package unit containing a V-shaped bun, separator strips on the open end of said V-shaped bun and upon which a hot dog rests, a cooking station, dispensing means for transferring a package unit from said storage unit to said cooking station, reciprocally movable electrical heating pins for piercing the ends of a package to engage and cook a hot dog, electrical solenoids for reciprocally moving said pins, an electrical heating element affixed to and positioned below a heating pin, and coin operated timer means for actuating said dispenser means, said solenoids, and for controlling electrical current to said heating pins and heating element; said heating element engaging a bun below said separator strips to heat a bun when a hot dog is engaged and being cooked by said heating pins.

2. In a coin-operated hot dog dispensing machine having a storage unit carrying therein a plurality of package units each containing a hot dog in a bun, a cooking station, dispensing means for transferring a package from said storage unit to said cooking station, and heating pins for engaging a hot dog when in said cooking station to cook the same; the improvement comprising having in addition a heating element affixed to and disposed below at least one of said heating pins and wherein each said package unit comprises a box, a V-shaped bun, a hot dog, and separator strips placed upon the open end of said V-shaped bun and on which said hot dog rests, said heating element being disposed below the separator strips when said heating pins engage a hot dog in order to heat a bun.

References Cited in the file of this patent
UNITED STATES PATENTS

| | | |
|---|---|---|
| 2,075,474 | Scutt | Mar. 30, 1937 |
| 2,256,976 | Ford | Sept. 23, 1941 |
| 2,274,325 | Ford | Feb. 24, 1942 |
| 2,794,384 | Sierk et al. | June 4, 1957 |

FOREIGN PATENTS

| | | |
|---|---|---|
| 350,436 | Great Britain | June 5, 1931 |